United States Patent

Divisek et al.

[11] Patent Number: 4,645,607
[45] Date of Patent: Feb. 24, 1987

[54] PROCESS FOR REDUCTION OR OXIDATION OF MATERIALS IN WATER SOLUTION BY PASSING A GAS THROUGH A CATALYST IMMERSED IN SOLUTION IN THE PRESENCE OF ELECTRICALLY CONDUCTING BODIES

[75] Inventors: Jiri Divisek; Leander Fürst, both of Jüich; Bertel Kastening, Hamburg; Harald Luft, Niederzier, all of Fed. Rep. of Germany

[73] Assignee: Kernforschungsanlage Jülich Gesellschaft mit beschränkter Haftung, Jülich, Fed. Rep. of Germany

[21] Appl. No.: 768,175

[22] Filed: Aug. 22, 1985

Related U.S. Application Data

[63] Continuation of Ser. No. 500,974, Jun. 3, 1983.

[30] Foreign Application Priority Data

Jun. 5, 1982 [DE] Fed. Rep. of Germany ....... 3221306

[51] Int. Cl.$^4$ .............................................. B01J 8/00
[52] U.S. Cl. .................................... 210/719; 210/721; 210/757; 210/763; 210/720; 502/339; 502/527
[58] Field of Search ................ 204/105 R, 141.5, 149, 204/302, 280; 210/719, 721, 757, 763, 758; 502/205, 220, 339, 527

[56] References Cited

U.S. PATENT DOCUMENTS

| 3,403,057 | 9/1968 | Stankavich et al. | 204/38.4 |
| 3,516,916 | 6/1970 | Ackermann | 204/280 |
| 3,663,298 | 5/1972 | McCoy et al. | 204/280 |
| 4,013,554 | 3/1977 | Reis et al. | 204/149 |
| 4,059,493 | 11/1977 | Rice | 204/280 |
| 4,256,557 | 3/1981 | Soboroff et al. | 204/149 |
| 4,331,520 | 5/1982 | Juda et al. | 204/105 R |
| 4,432,872 | 2/1984 | Faul et al. | 210/205 |

OTHER PUBLICATIONS

Fleet, "Chemistry and Industry", Mar. 13, 1971, pp. 300–303.

Primary Examiner—T. Jung
Attorney, Agent, or Firm—Frishauf, Holtz, Goodman & Woodward

[57] ABSTRACT

In a process for reduction or oxidation of materials in aqueous solution by passing a reagent gas through a finely porous catalyst layer into the solution, bodies of electrically conducting material which in the aggregate have a large surface are brought into electrically conducting connection with the catalyst layer on its side facing the solution in order to increase the rate of conversion of the dissolved material. The conducting bodies are distributed in the solution at least in the region of the catalyst layer and increase the effective surface for the conversion of the dissolved material. The invention is particularly useful in connection with catalyst layers provided with an electrically conducting protective cover through which gas and solution may pass on the side of the catalyst layer facing the solution as disclosed in a related application of the same inventors Ser. No. 500,941 filed June 3, 1983.

11 Claims, 3 Drawing Figures

PROCESS FOR REDUCTION OR OXIDATION OF MATERIALS IN WATER SOLUTION BY PASSING A GAS THROUGH A CATALYST IMMERSED IN SOLUTION IN THE PRESENCE OF ELECTRICALLY CONDUCTING BODIES

This application is a continuation of application Ser. No. 500,974, filed June 3, 1983.

This invention concerns a process for reduction or oxdation of reducible or oxidizable materials in a water solution by passing a gaseous reduction or oxidation agent through a finely porous catalyst layer containing an electrochemically effective catalyst.

It is known to eliminate noxious materials in water solution by oxidation or reduction or to recover metals from a water solution by reduction of the metal ions. Such processes serve, for example, for the cleaning of waste water, where the content of pollutants must be reduced to low values because of their possible toxic effects or for recovery of valuable metals for re-use. The detoxification of solutions containing cyanide or sulfite by means of oxygen with activated carbon as a catalyst or with electrode materials of fuel cells utilized as a catalyst is described in German Pat. No. 27 14 075, corresponding to U.S. patent application Ser. No. 889,956, filed Mar. 24, 1978 and since abandoned. Catalytic reduction of chromate with hydrogen is described in U.S. Pat. No. 4,159,309, where there is also described a reduction process for precipitation of metals by hydrogen in water solutions containing metal ions. In the last mentioned two cases, materials which are suitable for the electrochemical oxidation of hydrogen are used as catalysts.

In U.S. patent application Ser. No. 274,622, filed June 17, 1981, now U.S. Pat. No. 4,432,872 the disclosure of which was published in German in DE-OS No. 30 23 703, there was described a finely porous catalyst layer containing the catalyst disposed on a carrier body of porous material. The carrier body and the catalyst layer are both permeable by gas and allow gas to pass therethrough, so that the oxidizing or reducing agents proceed uniformly distributed through the layer into the solution. The uniform passing of gas through the finely porous catalyst layer provides a sufficient rate of conversion and a high yield even for solutions that contain suspended material or other fine contaminants carried along in the solution. The catalyst layer is applied to the surface of the porous carrier body on its side facing the solution. Plates of porous graphite or hollow bodies, such as closed-end cylinders of porous carbon, preferably serve as carrier bodies in the above-mentioned apparatus.

In carrying out the oxidation or reduction process with a catalyst layer through which the gaseous oxidation or reduction agent passes, there is the disadvantage that especially in the case of low concentration of the material to be in the solution which is to be converted, the conversion takes place only at very low speeds, because the speed of conversion depends upon the transport of material out of the solution to the catalyst layer and is therefore proportional to the concentration of the material in the solution. Therefore, in general, about the same treatment time is required to diminish the material content from its initial value down to 10% thereof and from that 10% of the initial content down to 1%. For these reasons, the available capacity of the catalyst layer is not fully utilized, even at high initial concentrations and during the first treatment phase.

SUMMARY OF THE INVENTION

It is an object of the present invention to provide a process in which the conversion velocity of the dissolved material is increased without at the same time requiring more catalyst and without increase of the space required for the treatment.

Briefly, at least in the region of infusion of the gas into the solution through the catalyst layer, bodies of electrically conducting material are immersed in the solution and are brought into electrically conducting contact with the catalyst layer. Thus the catalyst layer, on its side facing the solution, is brought into contact with bodies of electrically conducting material that in the aggregate have a large surface, thus increasing the effective surface for the conversion of the dissolved material. Previous processes operated on the basis that the electrochemical conversion of the reagent gas and the electrochemical conversion of the material to be removed from the solution had to take place at the same location, since for example in the reduction of the metallic ion by hydrogen the hydrogen oxidation, delivering the electrons, and the metal ion reduction taking up the electrons are not separable from each other in a process running without an external current source, although the reaction has a microheterogeneous character: compare in this connection W. Faul and B. Kastening, Chemie-Ingenieur-Technik 50, 1978, p. 533ff. It has now been found, however, that the bodies of conductive material immersed in the solutions that have a large surface exposed to the solution and are in electrically conducting connection with the catalyst layer are also effective for the conversion of the dissolved material when they are separated by several millimeters or even centimeters from the place of gas conversion at the catalyst. The maximum extent of the region in which the bodies can usefully be distributed in the solution, measured from the catalyst layer, is determined at least in part by the ion migration of the reaction partner in the solution. The desired rate of conversion is accordingly affected significantly both by the conductivity of the solution to be treated on the one hand and, on the other hand, by the redox potential difference between the system gas/reaction product of the gas and the system pollutant/reaction product of the pollutant which serves as the driving voltage for the ion migration. In the case of precipitation of metal, the second-mentioned system providing a redox potential is the system metal-ion/metal. It is practical to utilize in the practice of this invention also the invention described in our copending U.S. patent application Ser. No. 500,941 filed June 3, 1983 having the same priority date, by which there is interposed, between the catalyst layer and the solution, an electrically conducting protective covering for the catalyst layer through which the solution and the reagent gas can pass and to connect in electrically conducting contact the bodies of electrically conducting material immersed in the solution in accordance with the present invention with the conducting protective cover of the catalyst layer, in order to avoid impairment of the catalyst layer by the bodies immersed in the solution in accordance with this invention. Metallic bodies which magnify the surface which is effective for the conversion of the dissolved material are for example balled up metal wire, metal shavings or turnings, metal netting, metal wool, metal felt and the like. Graphite felt has also been found effective as electrically conducting material.

The provisions of the present invention lead to a considerable raising of the conversion velocity. Thus, for the treatment of a given quantity of waste water to be purified in a certain unit of time, a relatively small apparatus is required, with small catalyst quantity required, which is especially meaningful when the catalyst to be used is platinum or palladium.

A further substantial advantage of the process of the invention is provided when metals are to be precipitated from the aqueous solution. Metal precipitation actually takes place on the surfaces of the bodies of electrically conducting material washed by the solution. The precipitated metal is easily removable from the conducting bodies after the latter are taken out of the solution. It is useful to put into the solution bodies that consist of the same metal which is to be precipitated out of the solution. Thus, for example, copper shavings such as are produced in boring, milling and cutting with a lathe can be used in the precipitation of copper from solution. After the recovery of copper from solution, the shavings along with the copper deposited on them can be recycled for another use. It is particularly preferred, however, to utilize a material for the bodies to be immersed in the solution from which the metal to be precipitated can easily be separated. Thus, particularly for the precipitation of copper, balled up stainless steel wire (V2A) is used on which the copper is deposited and from which it comes off easily even with mechanical treatment, so that the precipitated copper can be obtained free of metallic impurities.

BRIEF DESCRIPTION OF THE DRAWINGS

The invention is further described by way of illustrative examples of the process of the invention, with reference to the annexed drawing, in which.

Figure 2:
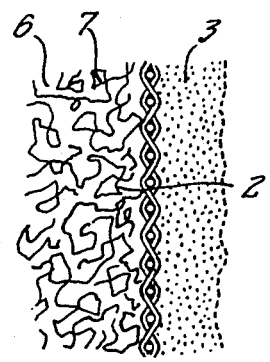
FIG. 2 is a more detailed cross-section on an enlarged scale of the portion designated by the circle II on FIG. 1.
Figure 3:
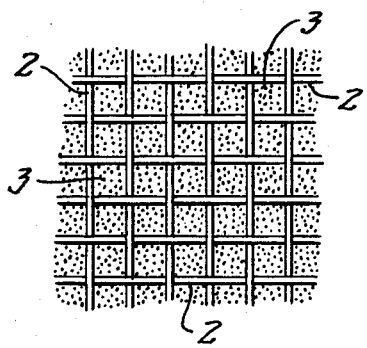
FIG. 3 is a detailed cross-section in a plane perpendicular to the plane of the cross-section of FIG. 2, viewed in the direction designated by the arrow III on FIG. 1.
Figure 1:
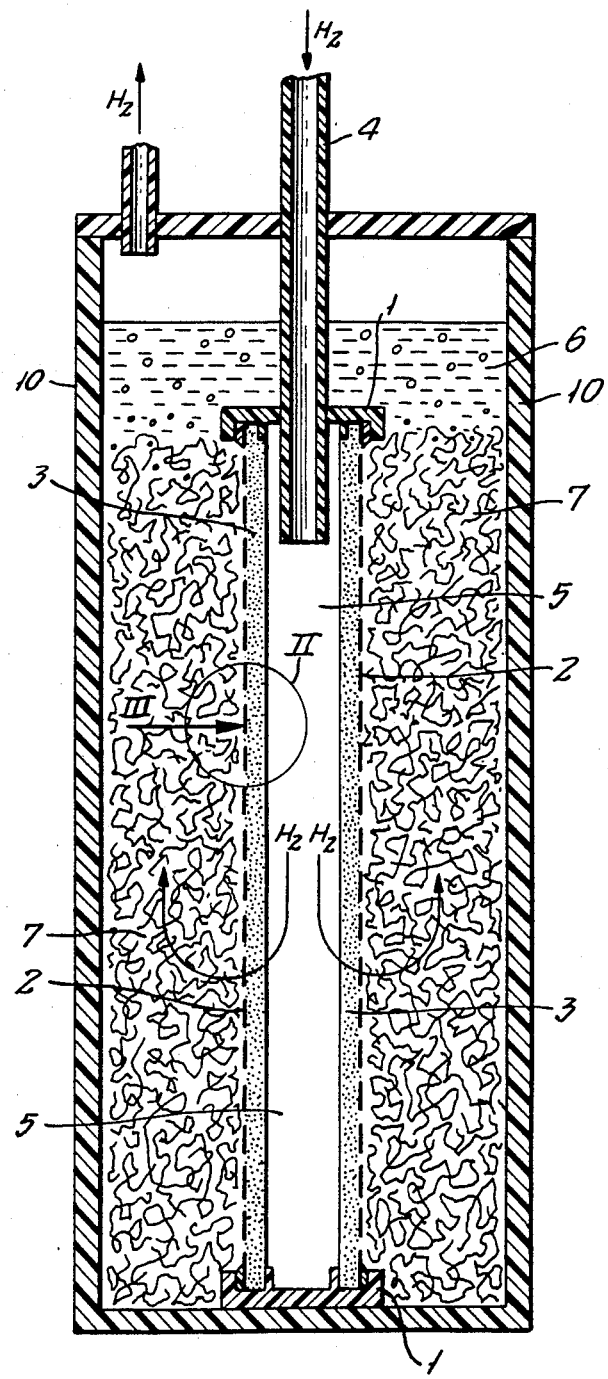
FIG. 1 is a diagrammatic cross-section of an apparatus for practicing the process of the invention, of the kind referred to in Example 2.

Illustrative examples for the process of the invention are given below,

DESCRIPTION OF THE EXAMPLES

EXAMPLE 1

On both sides of a square frame 1 of synthetic resin plastic measuring about 100 mm on an edge and having a thickness of a few millimeters there are respectively secured metal screens 2 of stainless steel wire (V2A, wire diameter 0.12 mm, mesh width 0.2 mm), so that a flat hollow body of a thickness of about 8 mm is produced having an effective outer surface of about 200 cm$^2$. The metal screens fastened on the plastic frame were previously coated on one side with a platinum-containing catalyst layer 3 activated carbon, polytetrafluorethylene and binder (e.g. rubber) and were so set in the plastic frame that in each case the coated side of the metal screens formed an interior side of the hollow body. A tube 4 for supply of the reagent gas into the interior space 5 was put through the plastic frame on which the coated metal netting was stretched. The plastic frame was then dipped into a container whre it became immersed in a solution 6 that initially contained copper sulfate in a concentration of 1900 mg Cu per liter and had an aggregate volume of 1400 ml. Passing hydrogen, which was introduced as the reagent gas into the inner space of the plastic frame, through the catalyst layer, the copper concentration in the solution was reduced after 45 minutes to 140 mg Cu per liter. The randomly balled-up stainless steel wire 7 shown in the drawing relates to Example 2 and was never present in this Example 1.

The same plastic frame equipped with coated metal screens was brought into electrically conducting contact, in a second experiment, with a fixed bed of copper shavings (not shown) distributed in the solution. The copper shavings, which were a by-product of machining, had a thickness of 0.2 mm, a width of 2 to 3 mm and various lengths. The aggregate quantity of the shavings amounted to 200 g. Total surface amounted to about 3600 cm$^2$. The passage of hydrogen gas through the catalyst layer in the same manner as above described, also served for stirring of the solution about the collection of copper shavings. By the reduction reaction 1400 ml of copper sulfate solution with an initial copper content of 1900 mg per liter was reduced within 45 minutes down to 3 mg Cu per liter.

EXAMPLE 2

With a plastic frame equipped with metal screens coated with a catalyst layer as described in Example 1, copper was first precipitated without the use of supplementary bodies in the solution out of 700 ml of a water solution containing initially 1850 mg Cu per liter. After 50 minutes the concentration in the solution had sunk to 100 mg Cu per liter. In a second experiment the coated metal screens were brought into contact with their uncoated sides facing the solution with balled up stainless steel wire (V2A) of 0.5 mm wire diameter and a total surface of about 500 cm$^2$, as shown at 7 in the drawing. The bodies 7 may be referred to a "stainless steel wool". As the result of passing hydrogen through the catalyst layer the concentration sank from the initial value of likewise 1850 mg Cu per liter to 1.3 mg Cu per liter within 50 minutes. The copper deposited on the stainless steel wire could easily be knocked off the wire thereafter.

EXAMPLE 3

A plastic frame on which were stretched coated metal screens as in Example 1 but in this case having an effective geometric surface of only 8 cm$^2$ was dipped in 90 ml of a silver nitrate solution with a content of 530 mg Ag per liter. 2.5 ml of saturated potassium nitrate solution was added to the solution for improving its conductivity. As a result of passing hydrogen through the apparatus a diminution of the silver content in the solution to 0.6 mg per liter was obtained within 70 minutes. When the outer surface was brought into electrically conducting contact with fine silver wool (fiber thickness 50 μm, calculated surface exposed to the solution about 160 cm$^2$) and the preceding experiment repeated, the diminution of the silver from 530 mg to 0.6 mg per liter was reached within only 9 minutes.

EXAMPLE 4

A plastic frame on which metal netting was stretched as in Example 1 and having 98 cm$^2$ of effective outer surface was immersed in 330 ml of a potassium chromate solution acidulated with sulfuric acid and having an initial content of chromium in the form of $CrO_3$ of 950 mg per liter and hydrogen was passed through the apparatus. Reduction of the chromate to trivalent chromium salt reduced the content of hexavalent chromium to 3 mg $CrO_3$ per liter after 133 minutes. The experiment was repeated with the outer surfaces of the metal screens brought into electrically conducting contact with uncoated folded stainless steel netting of the same kind as in the plastic frames. The total stainless steel netting surface of the stainless steel netting supplementarily placed into the solution was about 600 $cm^2$. When hydrogen was passed through the catalyst layer, a diminution from 950 mg to 3 mg $CrO_3$ per liter of solution was obtained within 96 minutes. With a stainless steel wire surface of about 1400 $cm^2$ the same diminution could be obtained within only 80 minutes.

EXAMPLE 5

A plastic frame on which was stretched metal wire netting as in the previous examples having only 7.3 $cm^2$ of effective surface was immersed in 73 ml of copper sulfate solution. Upon passing hydrogen through the apparatus a diminution of an initial content of 1850 mg Cu per liter of solution down to 472 mg Cu per liter was obtained after 50 minutes. When 20 g of a graphite granulate of cube-shaped graphite pieces of edge length of about 5 mm having an aggregate geometric surface of about 500 $cm^2$ were supplementarily immersed as a loosely packed bed in the solution and brought into electrically conducting contact with the catalyst layer, it was possible to obtain in 50 minutes a diminution of an initial copper content of 1850 mg per liter down to 48 mg Cu per liter.

EXAMPLE 6

A plastic frame on which metal wire netting was stretched as in Example 5 was immersed in 73 ml of copper sulfate solution and 8 g of graphite powder. The solution had an initial concentration of 1850 mg Cu per liter. By treatment with hydrogen the copper content of the solution was reduced in the suspension within 50 minutes down to 270 mg Cu per liter.

By the use of suspensions of conductive particles it is possible to make use also of catalyst layers applied to graphitic or ceramic porous carrier bodies without a protective covering, as such catalysts and carriers are known from previously mentioned German published patent application DE-OS No. 30 23 703. An increase of the conversion velocity the same order of magnitude is also obtained in this case.

EXAMPLE 7

A plastic frame with metal screens coated with a catalyst layer in the manner described in Example 1 and having an effective outer surface of 95 $cm^2$ was immersed in 475 ml of a sodium hydrogen sulfite solution into which air was forced through the catalyst layer. The pH value of the solution was set at 12 with KOH. As the result of the supplying of air it was possible to reduce the content of $SO_3^{--}$ anions from initially 3000 mg per liter to 840 mg per liter in 15 minutes. In a second experiment stainless steel wires having a surface in contact with the solution of about 500 $cm^2$ were supplementarily put into the solution and brought into electrically conducting contact with the stainless steel screens carrying the catalyst layer. By treating the solution with air forced through the catalyst layer the $SO_3^{--}$ content was reduced from an initial concentration of 3000 mg per liter this time down to 2 mg per liter in 15 minutes.

Although the invention has been described with reference to a variety of illustrative examples, it will be understood that other variations and modifications are possible within the inventive concept.

We claim:

1. Process for electroless reduction or oxidation of reducible or oxidizable materials in water solution comprising the step of passing a gaseous reducing or oxidizing agent through a porous catalyst layer immersed in said solution, said gaseous agent being thereby infused into said solution, which process also comprises the further steps of:

increasing the reaction speed by immersing in said solution at least in the region of infusion of said gas into said solution through said catalyst layer, bodies unattached mechanically with said catalyst layer, consisting of electrically conducting material, having a large surface of a kind increasing the effective surface for the conversion of dissolved material in solution and remaining distributed in the solution at least in said region, and maintaining at least a portion of said bodies continually in direct or indirect electrically conducting contact with said catalyst layer whereby said gaseous agent is oxidized or reduced at said catalyst layer and a component of said material in solution is reduced or oxidized at said unattached bodies of electrically conducting material distributed in the solution, by the effect of redox potential difference, as a result of said bringing into electrical contact.

2. Process according to claim 1, in which said bodies are of a material selected from the group consisting of metal wool, metal felt, metal netting, balled up metal wire, metal shavings, metal turnings and graphite felt.

3. Process according to claim 2, in which the step of maintaining at least a portion of said bodies in electrically conducting contact with said catalyst layer is facilitated by the presence of an electrically conducting foraminous covering for said catalyst layer on the gas exit side thereof.

4. Process according to claim 3, in which the reaction of said gaseous agent on said material in water solution results in precipitation of metal out of said solution, and in which said bodies are of the same metal as said precipitated metal.

5. Process according to claim 3, in which the reaction of said gaseous agent material in water solution results in the precipitation of a metal out of said solution, and in which said bodies are of stainless steel wire.

6. Process according to claim 3, in which the said bodies are particles held in suspension in said solution, and in which the step of bringing said particles into electrically conducting contact with said catalyst layer is performed in a manner bringing individual particles only intermittently into electrically conducting contact with said electrically conducting foraminous covering.

7. Process according to claim 3, in which said foraminous convering for said layer performs the function of supporting said layer.

8. Process according to claim 7, in which said foraminous covering and support for said layer is provided by wire netting stretched on a frame.

9. Process according to claim 2, in which the reaction of said gaseous agent on said material in water solution results in precipitation of a metal out of said solution, and in which said bodies are of the same metal as said precipitated metal.

10. Process according to claim 2, in which the reaction of said gaseous agent material in water solution results in the precipitation of a metal out of said solution, and in which said bodies are of stainless steel wire.

11. Process according to claim 2, in which said bodies are particles held in suspension in said solution, and in which the step of maintaining at least a portion of said particles continually in direct or indirect electrically conducting contact with said catalyst layer is performed in a manner bringing individual particles only intermittently into electrically conducting contact with said layer.

* * * * *